(12) United States Patent
Russell

(10) Patent No.: US 12,719,388 B2
(45) Date of Patent: Aug. 25, 2026

(54) SYSTEMS AND METHODS FOR GENERATING ENERGY FROM SOUND

(71) Applicant: Katherine Russell, Wallingford, CT (US)

(72) Inventor: Katherine Russell, Wallingford, CT (US)

( * ) Notice: Subject to any disclaimer, the term of this patent is extended or adjusted under 35 U.S.C. 154(b) by 1180 days.

(21) Appl. No.: 17/683,811

(22) Filed: Mar. 1, 2022

(65) Prior Publication Data

US 2023/0283205 A1 Sep. 7, 2023

(51) Int. Cl.
*H02N 2/18* (2006.01)

(52) U.S. Cl.
CPC .................................. *H02N 2/186* (2013.01)

(58) Field of Classification Search
CPC ........... H02N 2/18; H02N 2/186; G10K 15/00
See application file for complete search history.

(56) References Cited

U.S. PATENT DOCUMENTS 3,748,502 A * 7/1973 Bernstein .............. B06B 1/0655 310/319
4,467,236 A * 8/1984 Kolm ................... H10N 30/308 310/329
5,386,479 A * 1/1995 Hersh .................... H04R 1/403 381/345
6,782,109 B2 * 8/2004 Sheplak ............... G10K 11/172 381/431
8,067,878 B1 * 11/2011 Lu .......................... H02N 2/185 310/339
8,415,859 B2 * 4/2013 Lee .......................... H02N 2/18 290/1 R
2008/0238260 A1 * 10/2008 Xu ........................... H02N 2/18 310/339
2013/0062999 A1 * 3/2013 Muker-Uz-Zaman ....................... H02N 2/186 310/339
2013/0156508 A1 * 6/2013 DuBose .................. E02D 5/226 405/216

FOREIGN PATENT DOCUMENTS

KR 20140147912 A * 12/2014 ............. H10N 30/88

* cited by examiner

*Primary Examiner* — J. San Martin
(74) *Attorney, Agent, or Firm* — Wilmer Cutler Pickering Hale and Dorr LLP

(57) ABSTRACT

In one aspect, a method of generating energy includes providing a device comprising a rigid frame defining a three-dimensional space and having an open side; and a plurality of piezoelectric elements, each of the plurality of piezoelectric elements disposed on an inner surface of the rigid frame; exposing the plurality of piezoelectric elements to a soundwave; generating electricity by the piezoelectric elements in response to the soundwave. In one aspect, a device includes a rigid frame defining a three-dimensional space and having an open side; a plurality of piezoelectric elements, each of the plurality of piezoelectric elements disposed on an inner surface of the rigid frame, the plurality of piezoelectric elements configured to generate electricity in response to a soundwave.

23 Claims, 16 Drawing Sheets

502
506d
506e
506a
500
501
506b
506c 503b
503a
506c
506a
500
501
502
506b

SYSTEMS AND METHODS FOR GENERATING ENERGY FROM SOUND

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The instant application relates to devices and methods for generating energy from sound, such as by using piezo elements.

BACKGROUND

Noise pollution is a problem in various locales, such as cities, music or sports venues, near highways, near airports, or near waterfalls. For example, traffic on highways can generate sustained noise even at a distance of 100 meters from the highway. The noise generated in these areas currently provides no benefit. In addition, use of fossil fuels contributes to both noise and air pollution as well as to climate change. There is a need to identify additional sources of clean energy.

SUMMARY

In one aspect, a method of generating energy includes providing a device comprising a rigid frame defining a three-dimensional space and having an open side; and a plurality of piezoelectric elements, each of the plurality of piezoelectric elements disposed on an inner surface of the rigid frame; exposing the plurality of piezoelectric elements to a soundwave; generating electricity by the piezoelectric elements in response to the soundwave.

In some embodiments, the method includes providing an electronic component.

In some embodiments, the method includes providing power to the electronic component.

In one aspect, a device includes a rigid frame defining a three-dimensional space and having an open side; a plurality of piezoelectric elements, each of the plurality of piezoelectric elements disposed on an inner surface of the rigid frame, the plurality of piezoelectric elements configured to generate electricity in response to a soundwave.

In some embodiments, the frame has a shape selected from a parallelopiped shape, a rectangular prism, a trapezoidal prism, a funnel, a cone, and a dish.

In some embodiments, the rigid frame comprises a material selected from a group consisting of rigid plastic, metal, and combinations thereof.

In some embodiments, the plurality of piezoelectric elements are disposed on an inner surface of the frame adjacent to the open side.

In some embodiments, the plurality of piezoelectric elements are disposed on an inner surface of the frame adjacent to the open side.

In some embodiments, the frame has a closed side opposite the open side.

In some embodiments, the plurality of piezoelectric elements are disposed on the closed side.

In some embodiments, the open side has an area greater than an area of the closed side.

In some embodiments, the plurality of piezoelectric elements are aligned along an axis.

In some embodiments, the plurality of piezoelectric elements are aligned in an array.

In some embodiments, the plurality of piezoelectric elements provide power to an electronic component.

In some embodiments, the electronic component is selected from a group consisting of a light bulb, a light emitting diode, a battery, a personal electronic device, a wearable electronic, and combinations thereof.

In some embodiments, the plurality of piezoelectric elements comprise at least 6 piezo electric elements.

In some embodiments, each of the plurality of piezoelectric elements has an area of at least 500 $mm^2$.

In some embodiments, each of the plurality of piezoelectric elements has a sensitivity of at least 75 dB.

In some embodiments, the plurality of piezoelectric elements configured to provide power at a decibel level of at least 100 dB.

In some embodiments, the device includes a pivot configured to face the device toward a sound.

In some embodiments, the device is located within an area affected by noise pollution from an airport runway, a car tunnel, a train tunnel, a train track, a highway, a subway track, a subway station, or a waterfall.

In some embodiments, the device is attached to a vehicle.

In some embodiments, the device is a wearable device.

Any one of the embodiments disclosed herein may be properly combined with any other embodiment disclosed herein. The combination of any one of the embodiments disclosed herein with any other embodiments disclosed herein is expressly contemplated.

BRIEF DESCRIPTION OF THE DRAWINGS

The objects and advantages will be apparent upon consideration of the following detailed description, taken in conjunction with the accompanying drawings, in which like reference characters refer to like parts throughout, and in which.

DETAILED DESCRIPTION

In one aspect, a device includes a rigid frame; an electronic component; and a plurality of piezoelectric elements configured to provide power to the electronic component. A method of generating energy includes providing a device including a rigid frame; an electronic component; and a plurality of piezoelectric elements; exposing the plurality of piezoelectric elements to a soundwave; generating electricity by the piezoelectric elements in response to the soundwave; and providing power to the electronic component.

In one aspect, the device provides a means of converting soundwaves to electrical energy using piezoelectric elements. In this way, sound such as noise pollution is converted to a source of clean energy.

Piezoelectric materials are capable of converting mechanical energy to electrical energy and vice versa. When piezoelectric materials are exposed to an electric field, these materials respond with mechanical deformation, and when piezoelectric materials are exposed to mechanical deformation, these materials respond by creating an electrical current. For example, when piezoelectric materials are exposed to sound, soundwaves cause vibration or deformation, which is then converted by the piezoelectric material to an electrical signal or voltage. In this way, piezoelectric elements can act as transducers that convert mechanical energy from sound waves to electrical energy.

Figure 1:
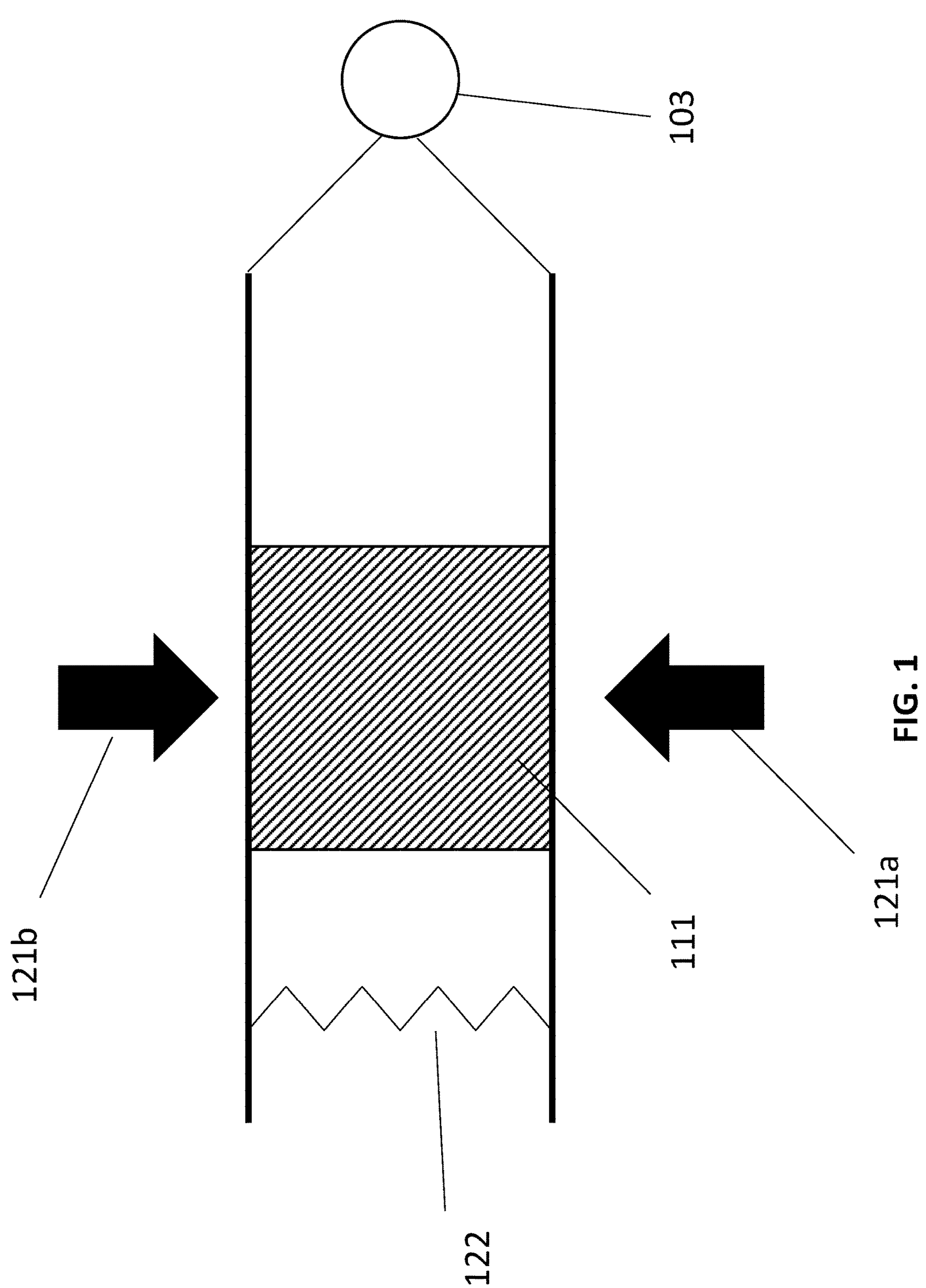
FIG. 1 shows a schematic of a piezoelectric material, according to certain embodiments.

FIG. 1 shows an exemplary piezoelectric material 111 that converts mechanical energy to electrical energy. As shown in FIG. 1, when a force 121*a*, 121*b* is applied to the piezoelectric material, a voltage 122 is generated. That voltage 122 can be used to power an electrical component, such as a lightbulb 103.

Figure 2:
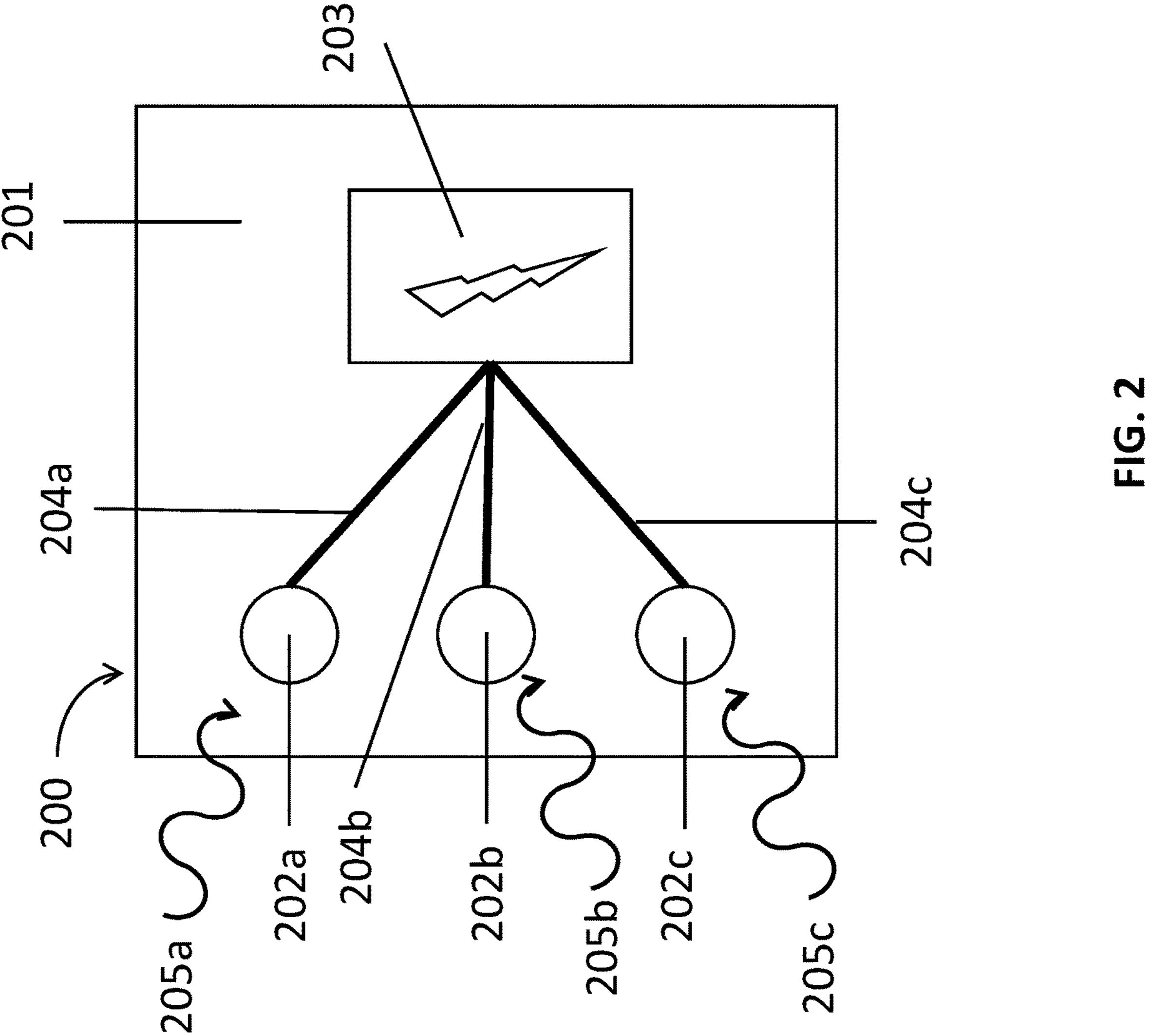
FIG. 2 shows schematic of an exemplary device for converting soundwaves to electrical energy using piezoelectric elements, according to certain embodiments.

FIG. 2 shows an exemplary device 200 for converting soundwaves to electrical energy using piezoelectric elements. The device includes a rigid frame 201 and a plurality of piezoelectric elements 202*a*, 202*b*, 202*c*. In some embodiments, the device further includes an electronic component 203. In some embodiments, the piezoelectric elements 202*a*, 202*b*, 202*c* are electrically connected to the electronic component 203 via wires 204*a*, 204*b*, 204*c*. When soundwaves 205*a*, 205*b*, 205*c* encounter the piezoelectric elements 202*a*, 202*b*, 202*c*, the piezoelectric elements are deformed by the vibration of the soundwaves, and the piezoelectric elements convert this deformation into an electric signal or voltage. This voltage then provides power to the electronic component 203 via the wires 204*a*, 204*b*, 204*c*. In some embodiments, the voltage is an alternating voltage.

In some embodiments, the device described herein converts noise pollution to green energy. In some embodiments, sources of noise pollution include cities, music or sports venues, highways, airports, trains, subways, or waterfalls. In some embodiments, the device is located close to sources of noise pollution or within an area affected by noise pollution. In some embodiments, the device is attached to a stationary structure near a source of noise pollution such as a city, music or sports venue, highway, airport, train track, or waterfall. For example, the device, the device can be located on an airport runway, in a car tunnel, in a train tunnel, along a train track, along a highway, along a subway track, in a subway station, or near a waterfall. In some embodiments, the device is attached to a moving object that causes or encounters noise pollution. For example, the device can be attached to a car, truck, airplane, or other vehicle. For example, piezoelectric elements could be placed in the hood of a car or truck. In this example, the hood serves to funnel soundwaves to the piezoelectric devices.

In some embodiments, the frame of the device has a three-dimensional shape that collects soundwaves or directs soundwaves to the piezoelectric devices. For example, the frame can have a three-dimensional shape that defines a space having an open side. Non-limiting examples of frame shapes are shown in FIGS. 8A-8G, and include a parallelopiped, a rectangular prism, a trapezoidal prism, a funnel, a cone, and a dish. In some embodiments, the frame has a concave shape that allows soundwaves to enter the frame. In some embodiments, the frame is completely or partially open on one side to allow soundwaves to enter the frame. In some embodiments, the frame is completely or partially open on two sides. In some embodiments, the frame has an open side and a closed side opposite the open side, and the area of the open side is greater than the area of the closed side. In embodiments where the area of the open side is greater than the area of the closed side, soundwaves are funneled toward the piezoelectric elements. In some of these embodiments, the piezoelectric elements are located on the closed side. Examples of configurations where the area of the open side is greater than the area of the closed side include trapezoidal prisms, funnels, and cones. Generally, these embodiments may capture sound energy well because they cause sound waves to bounce around and encounter the piezoelectric elements.

In some embodiments, the piezoelectric elements of the device are attached to a rigid frame. In some embodiments, the frame is made of a material that is sufficiently stiff to avoid damping of soundwaves that interact with the device. For example, if the frame includes soft or porous materials, a portion of the energy from the soundwaves is dissipated by damping or absorption, limiting the amount of sound energy that can be converted by the piezoelectric elements to electrical energy. In contrast, if the frame is made of a stiff material, most of the sound will be reflected when it hits the surface. In some embodiments, the frame is made of a material that is sufficiently stiff that the majority of soundwaves reflect when they hit the surface of the frame. In some embodiments, the soundwaves bounce against the walls of the frame until they encounter the piezo elements.

In some embodiments, the frame is made of a metal, hard plastic, or glass. Non-limiting examples of metals include steel, aluminum, iron, titanium, and combinations thereof. Non-limiting examples of hard plastics include acrylonitrile butadiene styrene (ABS), nylon 6, nylon 6-6, polyamides (PA), polybutylene terephthalate (PBT), polycarbonates (PC), polyetheretherketone (PEEK), polyetherketoneketone (PEKK), polyetherketone (PEK), polyketone (PK), polyethylene terephthalate (PET), polyimides, polyoxymethylene plastic (POM), polyphenylene sulfide (PPS), polyphenylene oxide (PPO), polysulphone (PSU), Poly(methyl methacrylate) (PMMA), high-density polyethylene (HDPE), ultra-high-molecular-weight (UHMWPE), polyetherimide (PEI), polystyrene (PS), polyvinyl chloride (PVC), and combinations thereof.

Figure 9A:
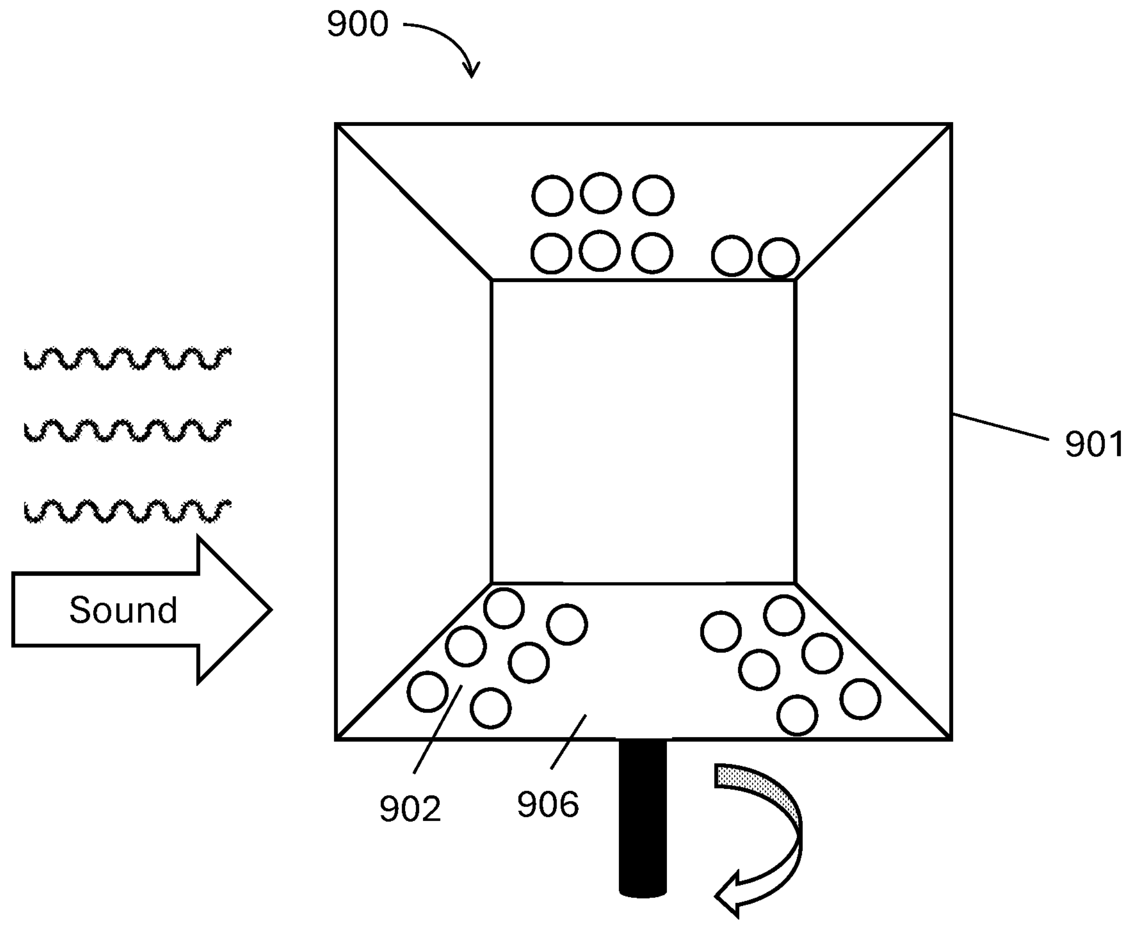
FIG. 9A shows a front view of a device including a pivot configured to face the device toward a source of sound, according to certain embodiments.
Figure 9B:
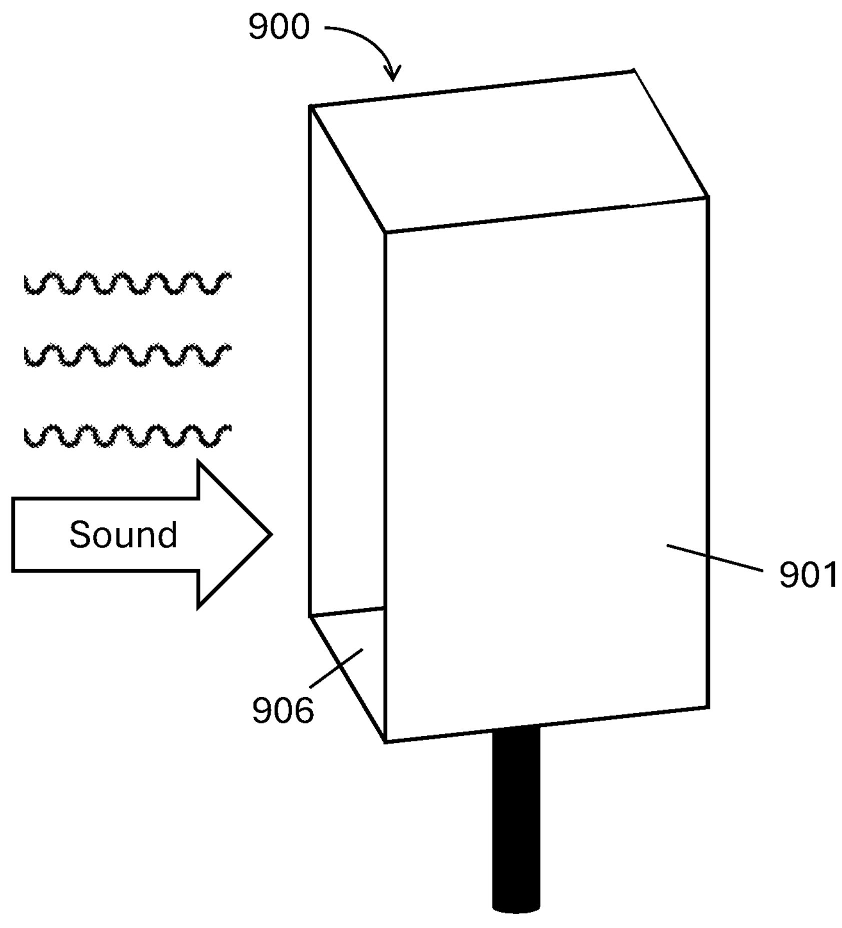
FIG. 9B shows a side-on view of a device including a pivot, that has pivoted to face the device toward a source of sound, according to certain embodiments.

In some embodiments, the frame is configured to face the device toward sources of sound. In some embodiments, sources of noise pollution are stationary, and the frame is configured to face the direction of the sources of sound permanently. In some embodiments, sources of sound move around, and the frame is attached to a pivot configured to face the device toward a source of sound, for example, as shown in FIGS. 9A-9B. For example, at an airport, airplanes move around, and a frame can be pivoted around to follow airplanes as they move.

In some embodiments, the size of the device is scalable based on the application. In some embodiments, the device has a size of between about three cubic feet and about ten cubic feet. Large devices can be used in locations with both a large amount of space and noise. For example large panels could be installed in train tunnels, auto tunnels, in stadiums (indoors or outdoors), or near waterfalls.

Piezoelectric elements are located on one or more surfaces of the frame. In some embodiments, piezoelectric elements are located to optimize the amount of sound energy converted to electricity by the piezoelectric elements, for example, by maximizing the exposure of the piezoelectric elements to sound waves. In some embodiments, piezoelectric elements are located on one or more outer surfaces of the frame. In some embodiments, piezoelectric elements are located on one or more inner surfaces of the frame. In some embodiments, piezoelectric elements are located on an inner surface of the frame that is adjacent to an open side of the frame. In some embodiments, piezoelectric elements are located on an inner surface of the frame that is opposite an open side of the frame. In some embodiments, piezoelectric elements are placed on all surfaces of the frame exposed to soundwaves, for example on all interior panels of a device.

In some embodiments, piezoelectric elements are arranged to optimize the amount of sound energy converted to electricity by the piezoelectric elements, for example, by maximizing the exposure of the piezoelectric elements to sound waves. In some embodiments piezoelectric elements are aligned along an axis. In some embodiments, piezoelectric elements are arranged in an array.

In some embodiments, the device includes at least 6 piezoelectric elements. In some embodiments, the device includes 6-10 piezoelectric elements. For example, 6-10 piezoelectric elements can power a 100 W light bulb. In some embodiments the device includes 20-30 piezoelectric elements. In some embodiments, the device includes at least 30 piezoelectric elements. In some embodiments, the device includes 6, 7, 8, 9, 10, 15, 20, 25, or 30 piezoelectric elements or in any number of piezoelectric elements in the range bounded by any value disclosed herein. In some embodiments, the device includes more than 30 piezoelectric elements. In some embodiments, the number of piezoelectric elements depends on the size of the piezoelectric elements and the size of the frame.

In some embodiments, larger piezoelectric elements are used to increase the amount of sound energy converted to electricity by the piezoelectric elements. In some embodiments, the piezoelectric elements have an area of at least 500 $mm^2$. In some embodiments, the piezoelectric elements have diameter of at least 27 mm. In some embodiments, the piezoelectric elements have a diameter of at least 35 mm. In some embodiments, the piezoelectric element has a diameter of 27 mm, 35 mm, or any value in between. In some embodiments, the piezoelectric element has a diameter between 1 mm and 254 mm, for example, 1 mm, 5 mm, 10 mm, 20 mm, 30 mm, 40 mm, 50 mm, 75 mm, 100 mm, 125 mm, 150 mm, 175 mm, 200 mm, 225 mm, 250 mm, 254 mm, or in any range bounded by any value disclosed herein.

In some embodiments, the number and size of the piezoelectric elements are selected based on the power needs of the electronic device. For example, 20 piezo electric elements with a diameter of 27 mm provide sufficient energy for 13V.

In some embodiments, the sensitivity of the piezoelectric elements is selected based on the expected noise level. In some embodiments, a piezoelectric element is selected to have a sensitivity capable of generating power in response to noise at 50-120 decibels. In some embodiments, the piezoelectric element is capable of generating power in response to 75 dB, which is about the sound level of a vacuum cleaner. In some embodiments, the piezoelectric electric element is capable of generating power in response to noise at 50 dB, 60 dB, 70 dB, 80 dB, 90 dB, 100 dB, 110 dB, 120 dB, or in any range bounded by any value disclosed herein.

In some embodiments, the piezoelectric element generates a voltage. In some embodiments, the voltage has a magnitude that depends in part on the material of the piezoelectric element or the size of piezoelectric element (e.g., the size of a piezoelectric crystal). In some embodiments, the voltage has a magnitude that depends in part on the magnitude of the incoming soundwave. For example, a soundwave with greater energy will generated a greater voltage. In some embodiments, multiple piezoelectric devices are coupled to create an aggregate voltage.

In some embodiments, the piezoelectric frequency is selected to match the frequency of the sound to be captured. For example, while high frequency noises can be captured by any size of piezoelectric elements, low frequency noises are more easily captured using larger piezoelectric elements.

Figure 3:
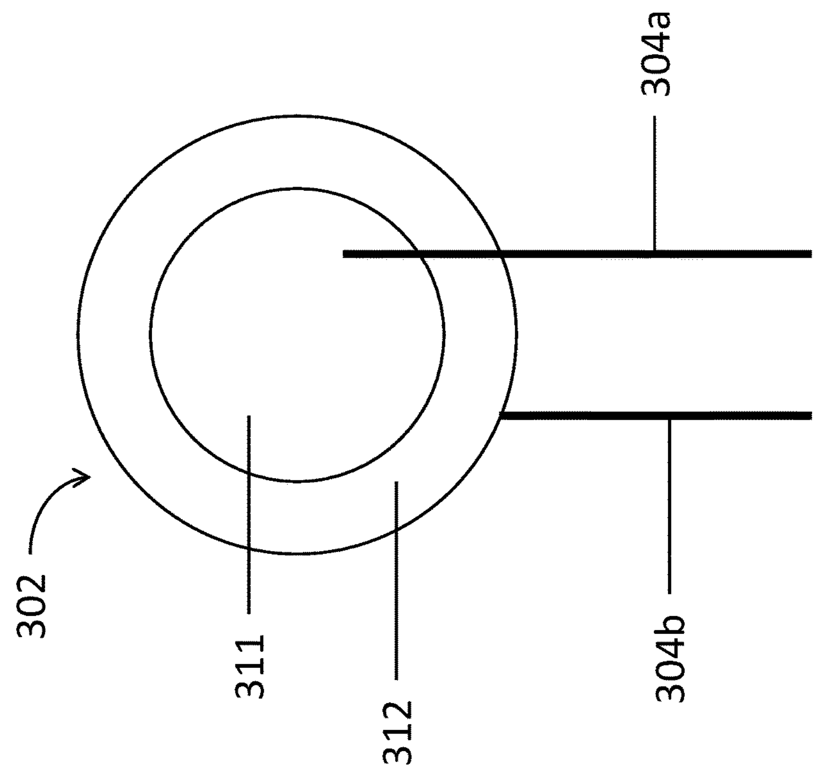
FIG. 3 shows a schematic of a piezoelectric transducer, according to certain embodiments.

In some embodiments, the piezoelectric elements are piezoelectric transducers. FIG. 3 shows an exemplary piezoelectric transducer 302. For example, a piezoelectric transducer 302 can include a disk of piezoelectric material 311 attached to a metal disk 312. In this example, there is a wire 304*a* attached to the disk of piezoelectric material and a wire 304*b* attached to the metal disk.

Exemplary piezoelectric materials include crystalline materials, ceramics, Group III-V semiconductors, and Group II-VI semiconductors. In some embodiments, piezoelectric materials include materials with perovskite structure, wurzite, zincblende structure. Non-limiting examples of piezoelectric materials include lead zirconate titanate (PZT), barium titanate, lead titanate, gallium nitride (GaN), indium nitride (InN), aluminum nitride (AlN), zinc oxide (ZnO), $(Bi_{1/2}K_{1/2})$ $TiO_3$ [BKT], Langasite (La3Ga5SiO14), gallium orthophosphate ($GaPO_4$), lithium niobate ($LiNbO_3$), Lithium tantalate ($LiTaO_3$), quartz, berlinite ($AlPO_4$), rochelle salt, topaz, tourmaline-group minerals, lead titanate ($PbTiO_3$), Potassium niobate ($KNbO_3$), sodium tungstate ($Na_2WO_3$), $Ba_2NaNb_5O_5$, $Pb_2KNb_5O_{15}$, potassium niobate ($KNbO_3$ [KN]), sodium potassium Niobate ((K, Na) $NbO_3$ [KNN]), bismuth ferrite ($BiFeO_3$), sodium niobate ($NaNbO_3$), barium titanate ($BaTiO_3$), bismuth titanate ($Bi_4Ti_3O_{12}$), sodium bismuth titanate ($NaBi(TiO_3)_2$).

In some embodiments, the piezoelectric elements are flexible to allow molding to curved surfaces. For example, a flexible piezoelectric element can be molded to a truck, car, or plane. Alternatively, a flexible piezoelectric element can be used on a road surface or buildings near a highway. In some embodiments, flexible piezoelectric elements include piezoelectric polymers. Non-limiting examples of piezoelectric polymers include polyvinylidene fluoride (PVDF), polyamides, paralyne-C, polyimide, polyvinylidene chloride (PVDC), and combinations thereof. In some embodiments, a polymer piezoelectric response is due to its molecular structure, e.g., amorphous or semi-crystalline. In some embodiments, flexible piezoelectric elements includes composites of piezoelectric ceramic particles in a flexible polymer film. Non-limiting examples of piezoelectric ceramic polymers for use in a flexible composite include lead zirconate titanate (PZT), barium titanate, lead titanate, gallium nitride (GaN), indium nitride (InN), aluminum nitride (AlN), zinc oxide (ZnO), ($Bi_{1/2}K_{1/2}$) $TiO_3$ [BKT], Langasite (La3Ga5SiO14), gallium orthophosphate ($GaPO_4$), lithium niobate ($LiNbO_3$), Lithium tantalate ($LiTaO_3$), quartz, berlinite ($AlPO_4$), rochelle salt, topaz, tourmaline-group minerals, lead titanate ($PbTiO_3$), Potassium niobate ($KNbO_3$), sodium tungstate ($Na_2WO_3$), $Ba_2NaNb_5O_5$, $Pb_2KNb_5O_{15}$, potassium niobate ($KNbO_3$ [KN]), sodium potassium Niobate ((K, Na) $NbO_3$ [KNN]), bismuth ferrite ($BiFeO_3$), sodium niobate ($NaNbO_3$), barium titanate ($BaTiO_3$), bismuth titanate ($Bi_4Ti_3O_{12}$), sodium bismuth titanate (NaBi $(TiO_3)_2$). Non-limiting examples of flexible polymers for use in a flexible composite include polydimethylsiloxane (PDMS), low density polyethylene (LDPE), linear low density polyehtylene (LLDPE), polyolefin (POF), polyethylene terephthalate (PET), polypropylene (PP), polyvinylidene fluoride (PVDF), polyaniline (PANT), polyvinyl chloride (PVC), polyetherimide, and combinations thereof.

In some embodiments, the piezoelectric elements are configured to provide power to an electronic device. Non-limiting examples of electronic devices include light bulbs, light emitting diodes (LEDs), personal electronic devices, and electronic storage devices. Exemplary personal electronic devices include wearable devices, portable phones, and tablets. Exemplary electronic storage devices include batteries. In some embodiments, the piezoelectric elements are configured to provide power to infrastructure, for example lighting or signage. In some embodiments, the piezoelectric elements are configured to provide power to cars and trucks. For example, using piezoelectric elements to power vehicles can increase the miles per gallon of combustion engines and increase range in electric vehicles.

In some embodiments, a battery is used to store energy generated by piezo elements for later use. In some exemplary applications, a large amount of sound is generated during certain times, while the need for energy is at different times. For example, rush hour traffic generates a large amount of sound energy on a highway. There may be less need for energy at this location during rush hour, but at night, when there may be less traffic, energy can be used to power street lights. In this example, a battery stores energy captured by piezoelectric elements from sound during rush hour and used at night to power streetlights. In other exemplary applications where the amount of sound is constant, storing energy in a battery is also beneficial. For example, sound from a waterfall is constant. Energy captured by piezoelectric elements from the sound of a waterfall can be used to power infrastructure for in a remote location and can be stored for later use, for example, at night.

In some embodiments, the device includes a switch to turn the electronic device on and off.

EXAMPLES

Certain embodiments will now be described in the following non-limiting examples.

I. Prototype 1

Figures 4A, 4B:
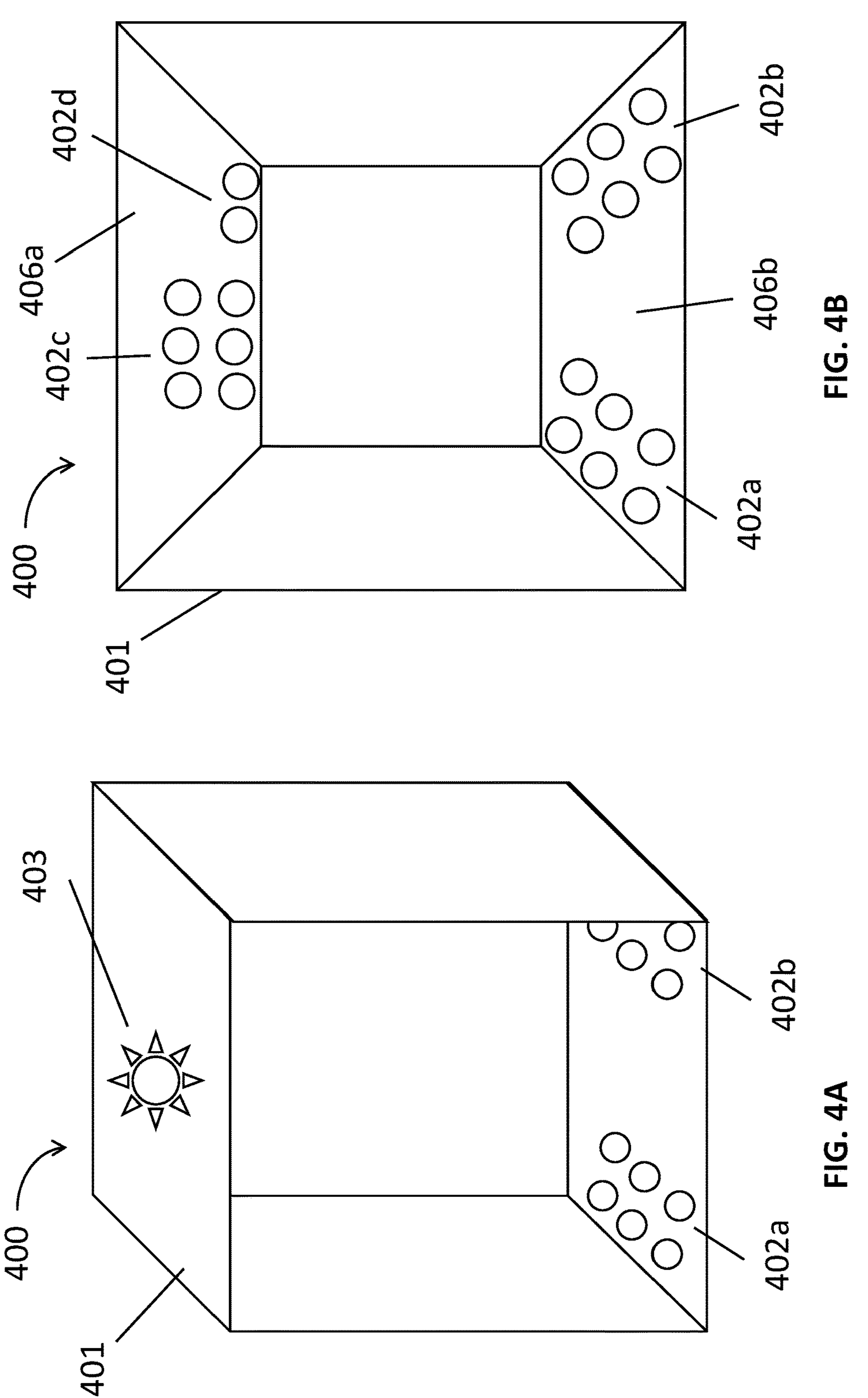
FIG. 4A shows an isometric view of a prototype device with a cardboard frame, according to certain embodiments.
FIG. 4B shows the inner surfaces of a prototype device with a cardboard frame, according to certain embodiments.

Prototype 1 400, shown in FIGS. 4A-4B, was made using a cardboard box as a frame 401. FIG. 4A shows an isometric view of Prototype 1, and FIG. 4B shows a view of the inner surfaces 406*a*, 406*b* of Prototype 1. The cardboard box was open on two sides and had four surfaces. The box was a cube with dimensions 10"×10"×10". Twenty piezoelectric elements were attached to two inner surfaces of the cardboard box using glue. The piezoelectric elements had included a brass metal disc, and had a diameter of 35 mm, a frequency of 6.4 kHz, and a resistance of 400 ohm. On a first inner surface, twelve piezoelectric elements were arranged in two two-by-three arrays 402*a*, 402*b*, each array arranged on the opposite side of the first surface. On the second inner surface, eight piezoelectric elements were arranged in one two-by-three array 402*c* and in one two-by-one array 402*d*. An LED light bulb 403 was attached to the top of the box. Each piezoelectric element was electrically connected to the light bulb via two wires (not shown). Each wire was soldered to a piezoelectric element on one end and the lightbulb on one end.

Prototype 1 was capable of powering the light bulb using twenty piezoelectric elements using a home stereo. However, it was observed that the cardboard box absorbed some of the soundwaves, necessitating a large number of piezoelectric elements and limiting the amount of energy that could be harvested by the prototype. Additionally, since the walls of the box were not steep, the ability of sound to bounce around within the device and encounter the piezoelectric elements was limited.

II. Prototype 2

Figures 5A, 5B:
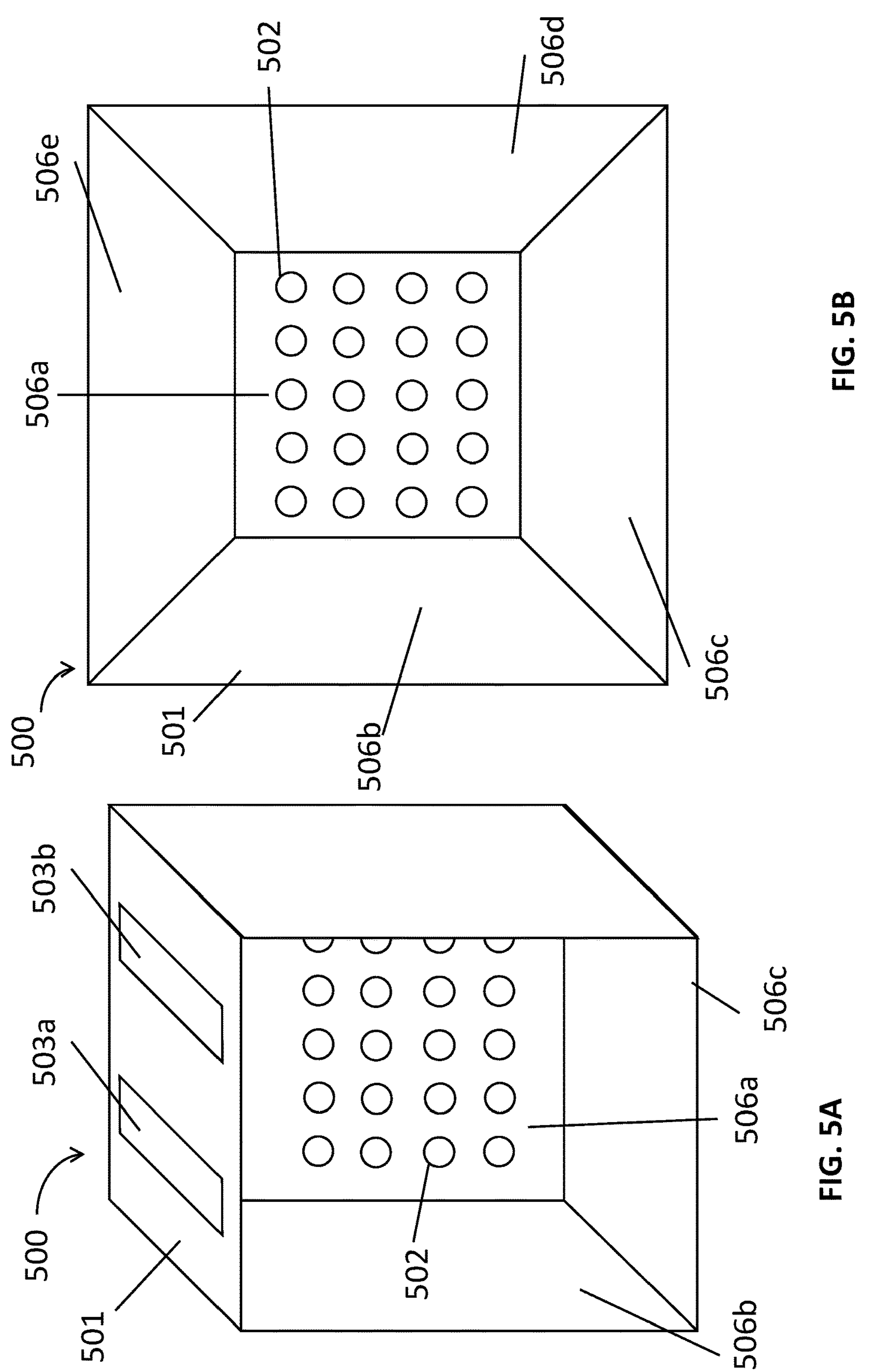
FIG. 5A shows an isometric view of a prototype device with a plastic frame, according to certain embodiments.
FIG. 5B shows the inner surfaces of a prototype device with a plastic frame, according to certain embodiments.

Prototype 2 500, shown in FIGS. 5A-5B was made using a plastic (polypropylene) as a frame 501. FIG. 4B shows an isometric view of Prototype 2, and FIG. 4B shows a view of the inner surfaces 506*b*, 506*c*, 506*d*, 506*e* of Prototype 2. The frame had one open side. By using a plastic frame, prototype 2 absorbed fewer soundwaves and instead reflected soundwave, allowing more sound to be converted to energy by the piezoelectric elements. The frame also had steeper side walls 506*b*, 506*c*, 506*d*, 506*e* than the frame in prototype 1, which allowed sound to bounce around within the box and encounter the piezoelectric elements.

Twenty piezoelectric elements 502 were used in prototype 2 on an inner wall 506*a* of the frame that is opposite an open side of the frame. The piezoelectric elements included a brass metal disc, and had a diameter of 35 mm, a frequency of 6.4 kHz, and a resistance of 400 ohm.

Figure 6:
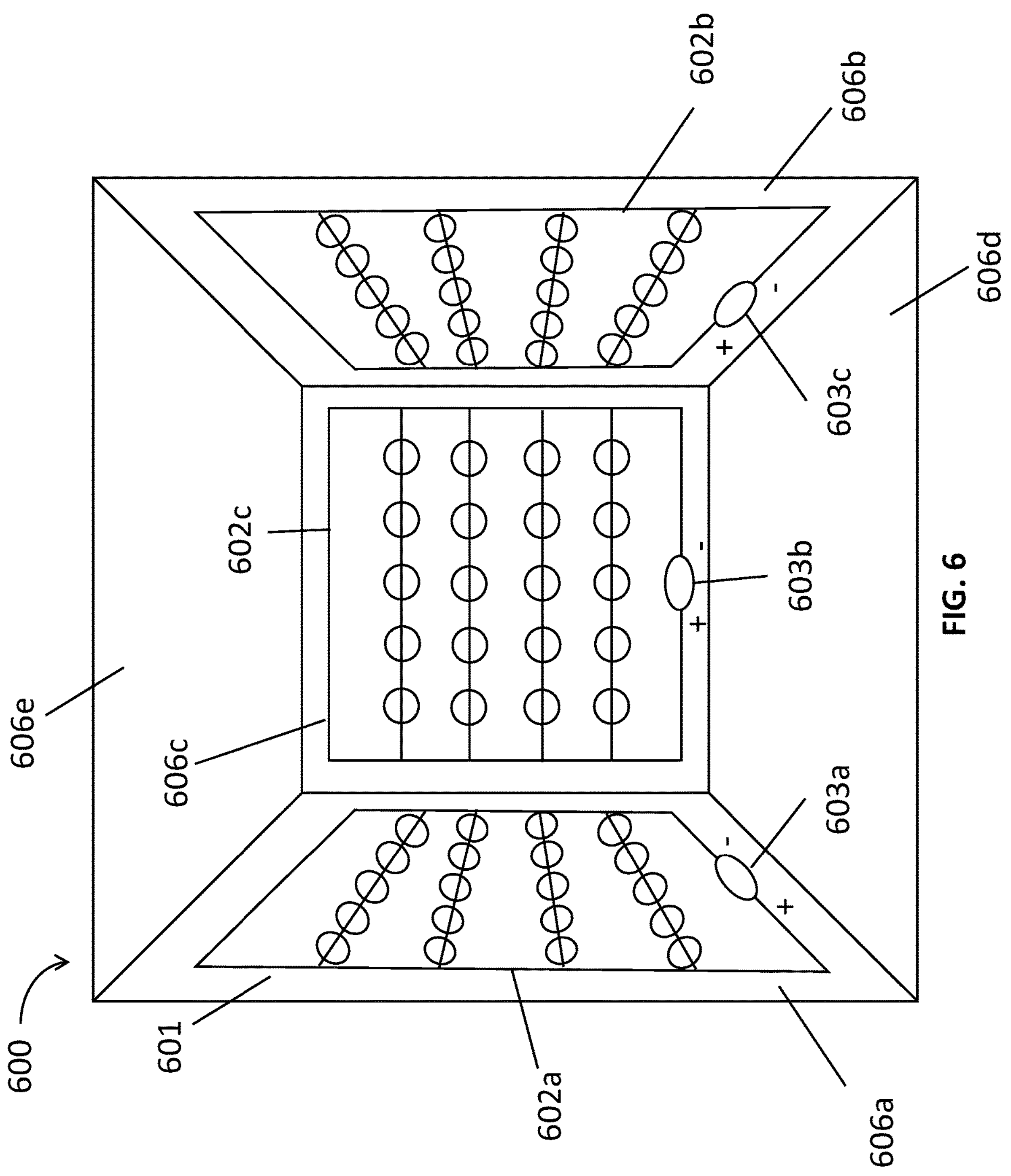
FIG. 6 shows a schematic the interior of a device with piezoelectric element arrays, according to certain embodiments.

III. Prototype 2 was Used to Power Two 15-Ampere LED Strips 503*a*, 503*b*. Piezoelectric Element Arrays FIG. 6 shows a schematic the interior of a device with piezoelectric element arrays, according to certain embodiments. In this exemplary device, the frame 601 has five inner surfaces, 606*a*, 606*b*, 606*c*, 606*d*, 606*e* and one open face. The exemplary device has three five-by-five arrays of piezoelectric devices 602*a*, 602*b*, 602*c*, with two arrays 602*a*, 602*b* on inner surfaces 606*a*, 606*b* adjacent to the open face and one array 602*c* opposite the open face. Each array powers a light bulb 603*a*, 603*b*, 603*c*.

IV. Aggregate Piezoelectric Elements

Figure 7:
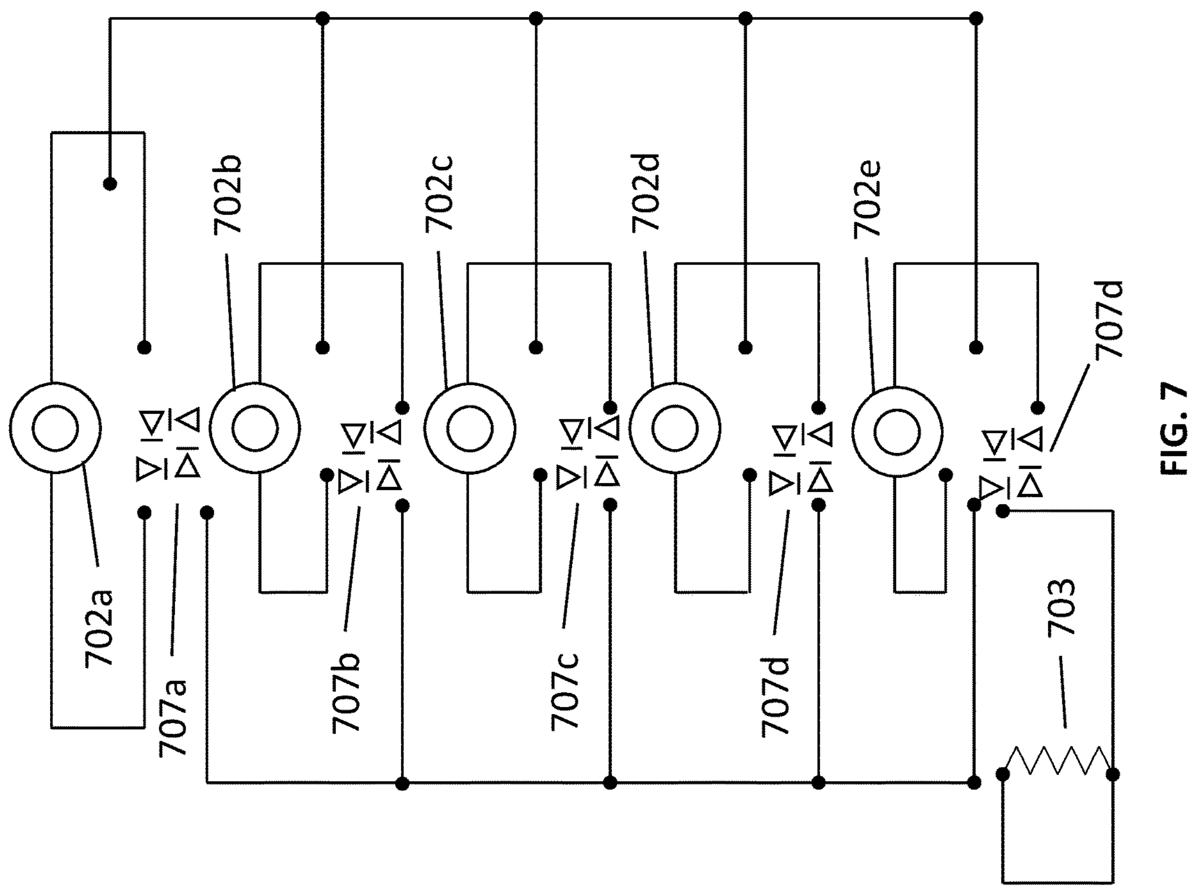
FIG. 7 shows an aggregation diagram of an exemplary device, according to certain embodiments.
Figure 8A:
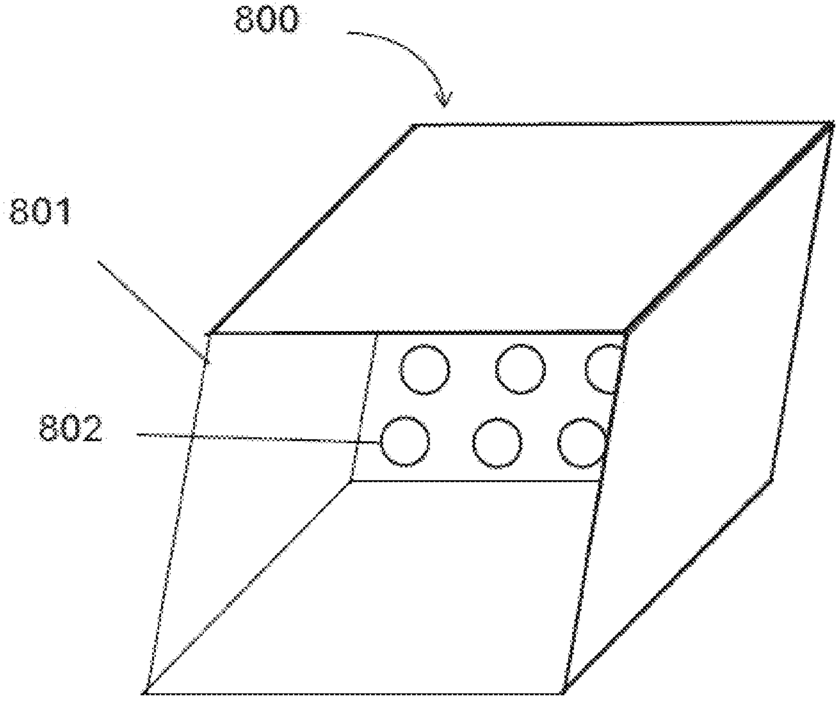
FIG. 8A shows a device where the frame has the three-dimensional shape of a parallelopiped, according to certain embodiments.
Figure 8B:
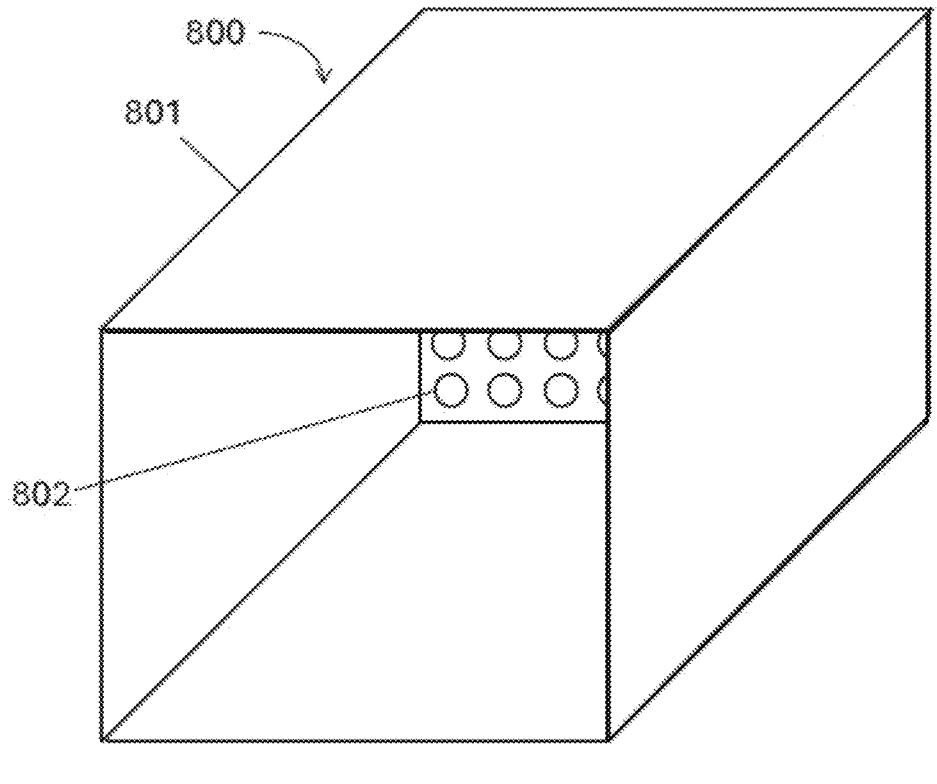
FIG. 8B shows a device where the frame has the three-dimensional shape of a rectangular prism, according to certain embodiments.
Figure 8C:
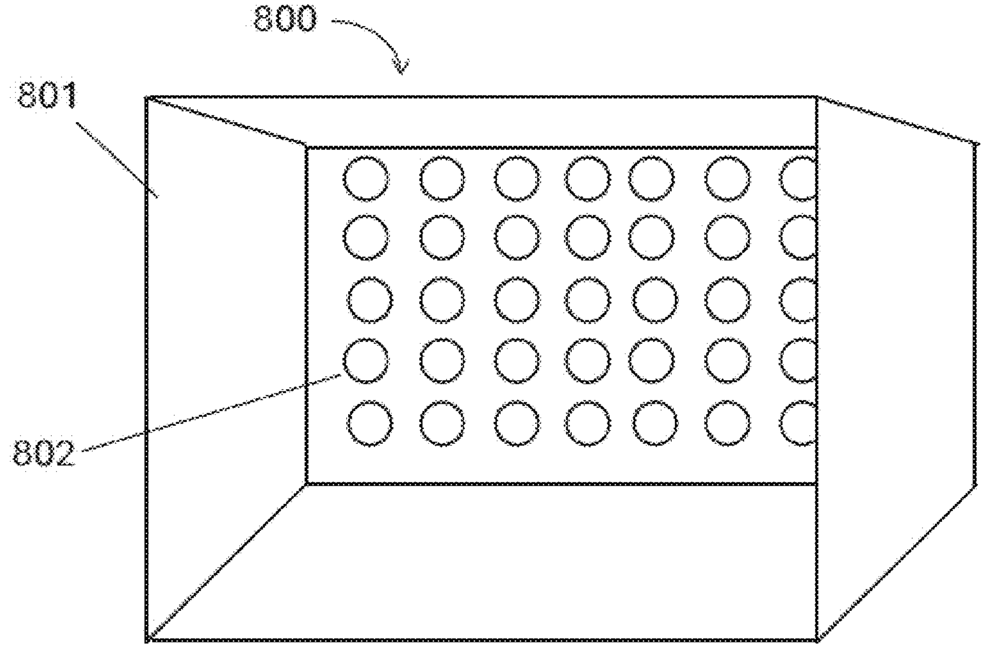
FIG. 8C shows a device where the frame has the three-dimensional shape of a trapezoidal prism, according to certain embodiments.
Figure 8D:
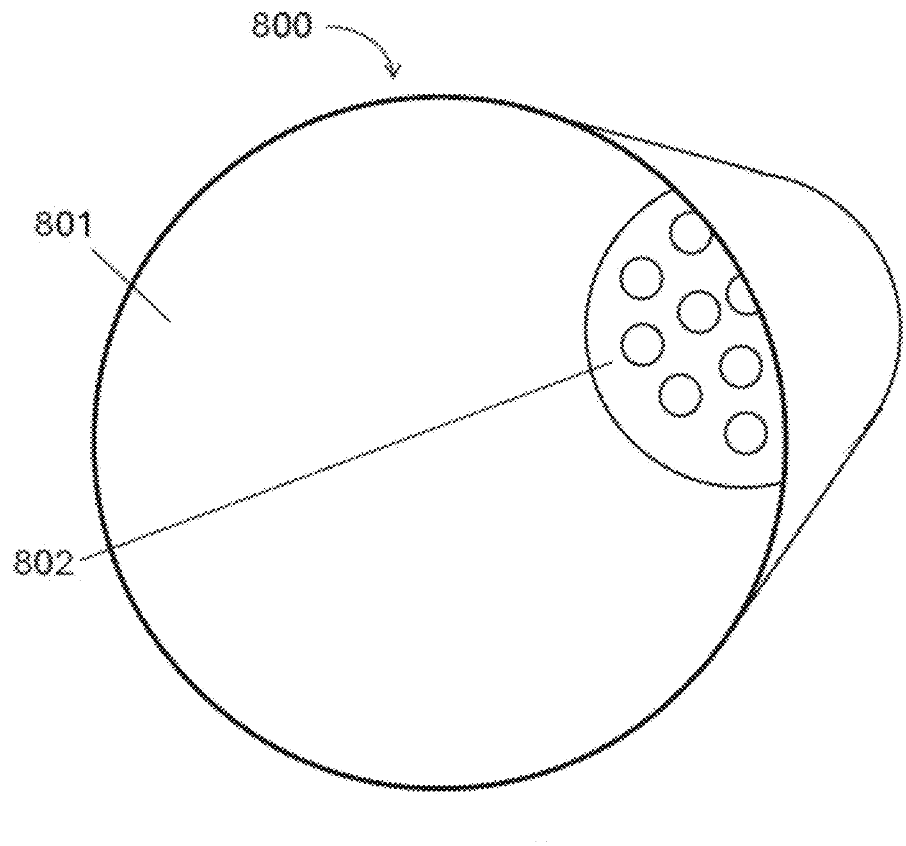
FIG. 8D shows a device where the frame has the three-dimensional shape of a funnel, according to certain embodiments.
Figure 8E:
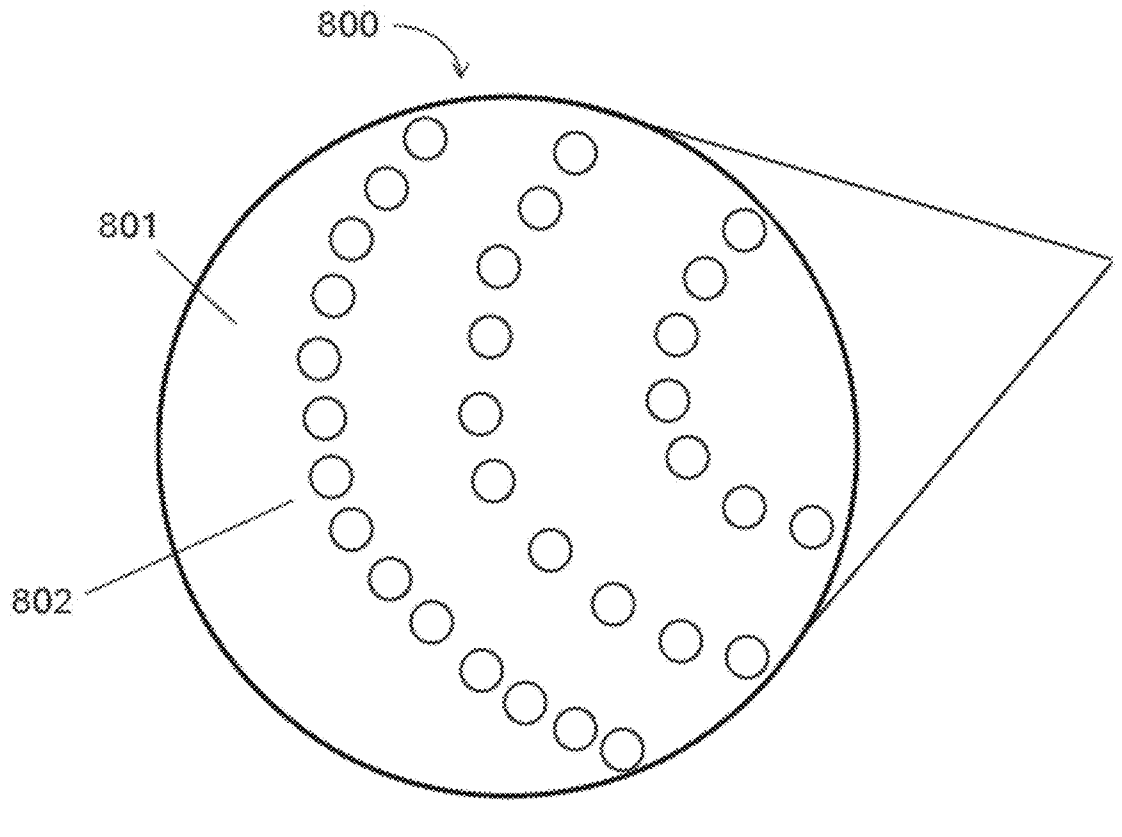
FIG. 8E shows a device where the frame has the three-dimensional shape of a cone, according to certain embodiments.
Figure 8F:
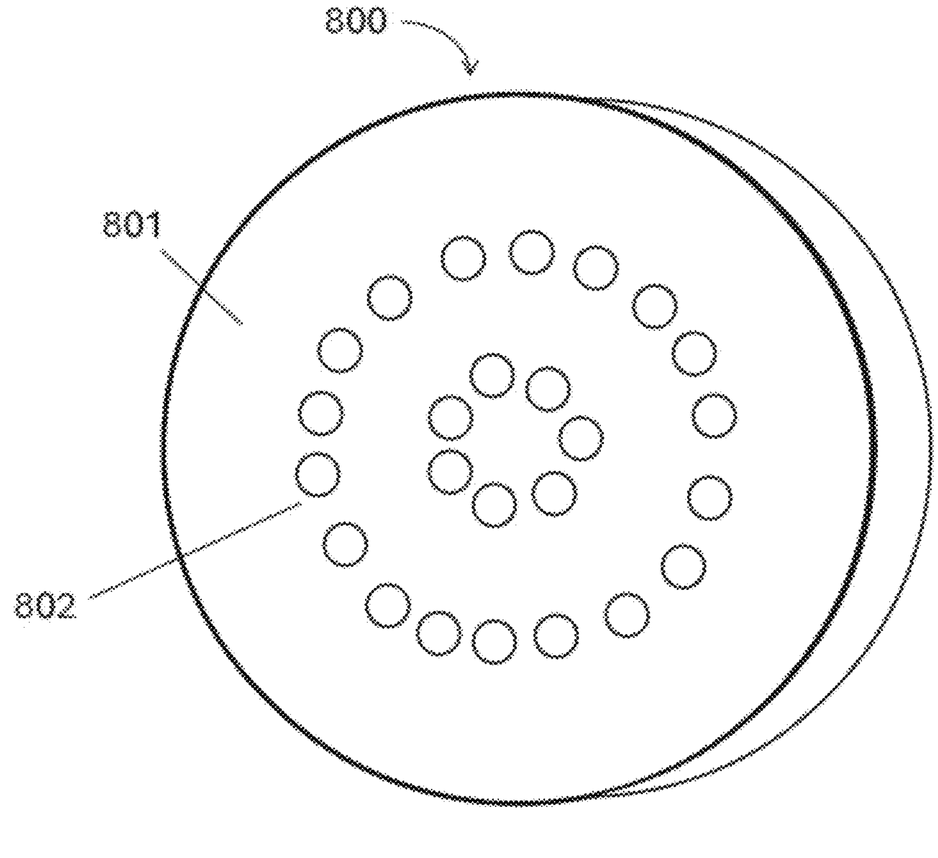
FIG. 8F shows a front view of a device where the frame has the three-dimensional shape of a dish, according to certain embodiments.
Figure 8G:
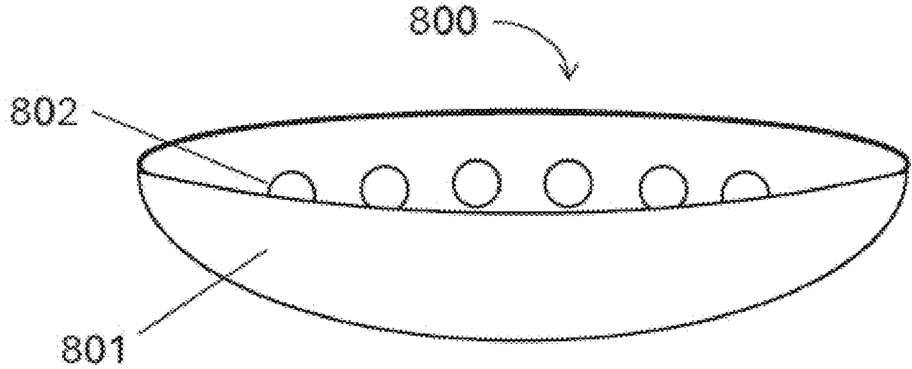
FIG. 8G shows a side-on view of a device where the frame has the three-dimensional shape of a dish, according to certain embodiments.

FIG. 7 shows an aggregation diagram for a device with multiple piezoelectric elements that create an aggregate voltage. FIG. 7 shows a circuit with five piezoelectric devices 702*a*, 702*b*, 702*c*, 702*d*, 702*e* connected in parallel to a resistor 703 (the load) of the device with diodes 707*a*, 707*b*, 707*c*, 707*d*, 707*e* arranged in a ring formation. The transducers generate a current which generates a voltage across the resistor 703. In this way, a plurality of transducers can provide power to a device, e.g., a lightbulb at the resistor.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

The invention claimed is:

1. A method of generating energy, the method comprising providing a device comprising a rigid frame defining a three-dimensional space, wherein the rigid frame has an open side and a closed side opposite the open side;

a pivot configured to face the device toward a sound; and a plurality of piezoelectric elements, each of the plurality of piezoelectric elements disposed on an inner surface of the rigid frame;

exposing the plurality of piezoelectric elements to a soundwave;

generating electricity by the piezoelectric elements in response to the soundwave.

2. The method of claim 1, further comprising providing an electronic component.

3. The method of claim 2, further comprising providing power to the electronic component.

4. A device comprising a rigid frame defining a three-dimensional space, wherein the rigid frame has an open side and a closed side opposite the open side;

a pivot configured to face the device toward a sound; and a plurality of piezoelectric elements, each of the plurality of piezoelectric elements disposed on an inner surface of the rigid frame, the plurality of piezoelectric elements configured to generate electricity in response to a soundwave.

5. The device of claim 4, wherein the frame has a shape selected from the group consisting of a parallelopiped shape, a rectangular prism, a trapezoidal prism, a funnel, a cone, and a dish.

6. The device of claim 4, wherein the rigid frame comprises a material selected from a group consisting of rigid plastic, metal, and combinations thereof.

7. The device of claim 4, wherein the plurality of piezoelectric elements are disposed on an inner surface of the frame adjacent to the open side.

8. The device of claim 4, wherein the plurality of piezoelectric elements are disposed on an inner surface of the frame adjacent to the open side and on an inner surface of the closed side.

9. The device of claim 4, wherein the frame comprises one or more of a material selected from the group consisting of acrylonitrile butadiene styrene (ABS), nylon 6, nylon 6-6, polyamides (PA), polybutylene terephthalate (PBT), polycarbonates (PC), polyetheretherketone (PEEK), polyetherketoneketone (PEKK), polyetherketone (PEK), polyketone (PK), polyethylene terephthalate (PET), polyimides, polyoxymethylene plastic (POM), polyphenylene sulfide (PPS), polyphenylene oxide (PPO), polysulphone (PSU), Poly(methyl methacrylate) (PMMA), high-density polyethylene (HDPE), ultra-high-molecular-weight (UHMWPE), polyetherimide (PEI), polystyrene (PS), and polyvinyl chloride (PVC).

10. The device of claim 4, wherein the plurality of piezoelectric elements are disposed on the closed side.

11. The device of claim 4, wherein the open side has an area greater than an area of the closed side.

12. The device of claim 4, wherein the plurality of piezoelectric elements are aligned along an axis.

13. The device of claim 4, wherein the plurality of piezoelectric elements are aligned in an array.

14. The device of claim 4, wherein the plurality of piezoelectric elements provide power to an electronic component.

15. The device of claim 14, wherein the electronic component is selected from a group consisting of a light bulb, a light emitting diode, a battery, a personal electronic device, a wearable electronic, and combinations thereof.

16. The device of claim 4, wherein the plurality of piezoelectric elements comprise at least 6 piezo electric elements.

17. The device of claim 4, wherein each of the plurality of piezoelectric elements has an area of at least 500 $mm^2$.

18. The device of claim 4, wherein each of the plurality of piezoelectric elements has a sensitivity of at least 75 dB.

19. The device of claim 4, wherein the plurality of piezoelectric elements configured to provide power at a decibel level of at least 100 dB.

20. The device of claim 4, wherein the device is located within an area affected by noise pollution from an airport runway and the pivot is configured to face the device toward an airplane traveling on the airport runway.

21. The device of claim 4, wherein the device is located within an area affected by noise pollution from an airport runway, a car tunnel, a train tunnel, a train track, a highway, a subway track, a subway station, or a waterfall.

22. The device of claim 4, wherein the device is attached to a vehicle.

23. The device of claim 4, wherein the device is a wearable device.

* * * * *